Feb. 26, 1924.
H. W. PARTLOW
1,484,668
HIGH PRESSURE GAS GOVERNOR
Filed Jan. 19, 1923     2 Sheets-Sheet 2
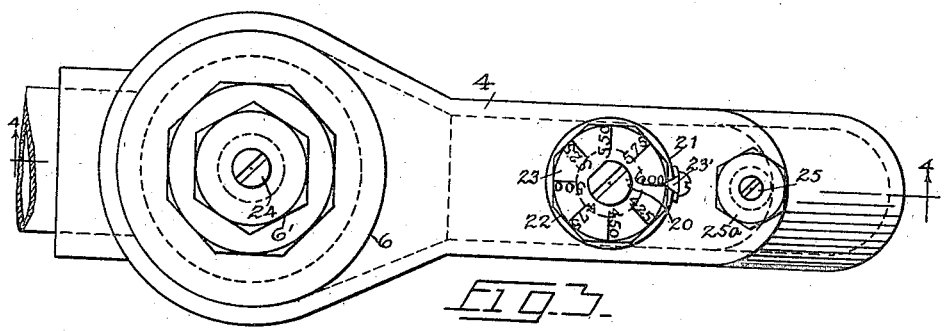
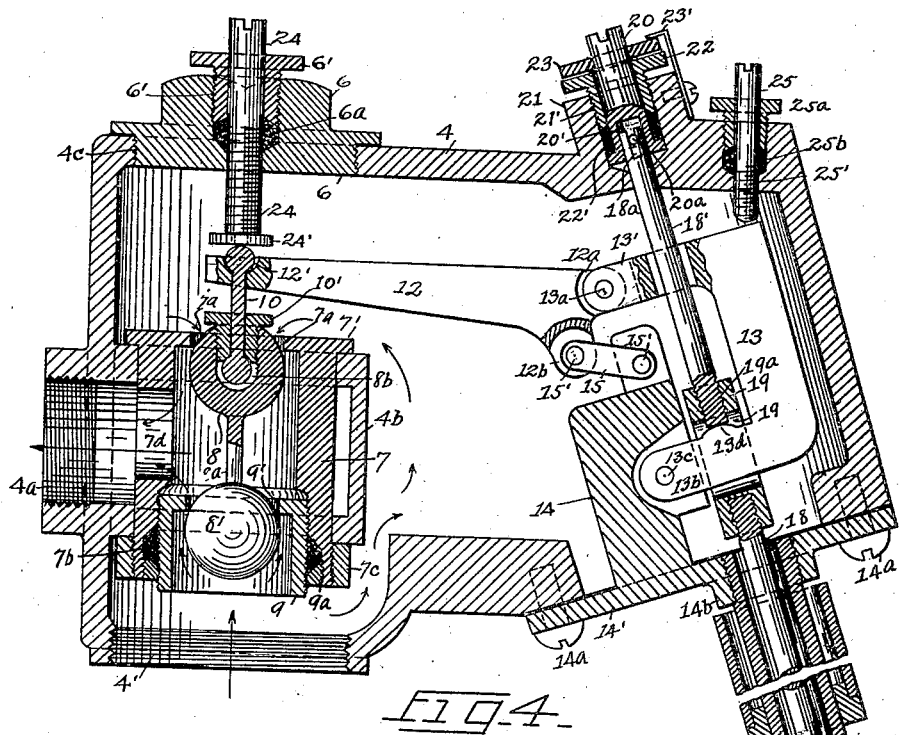
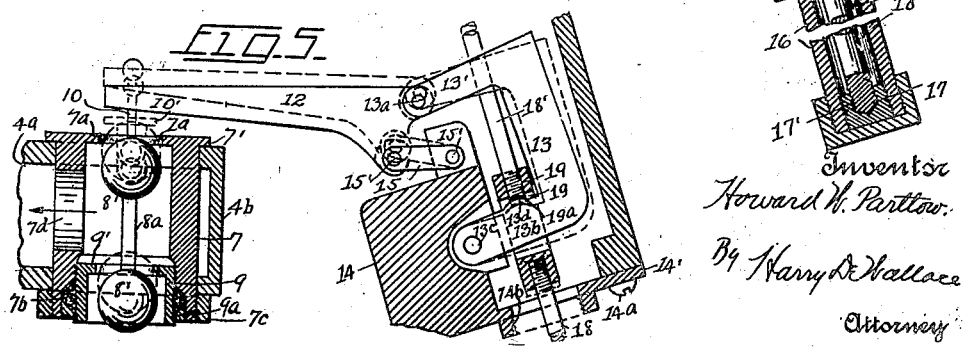

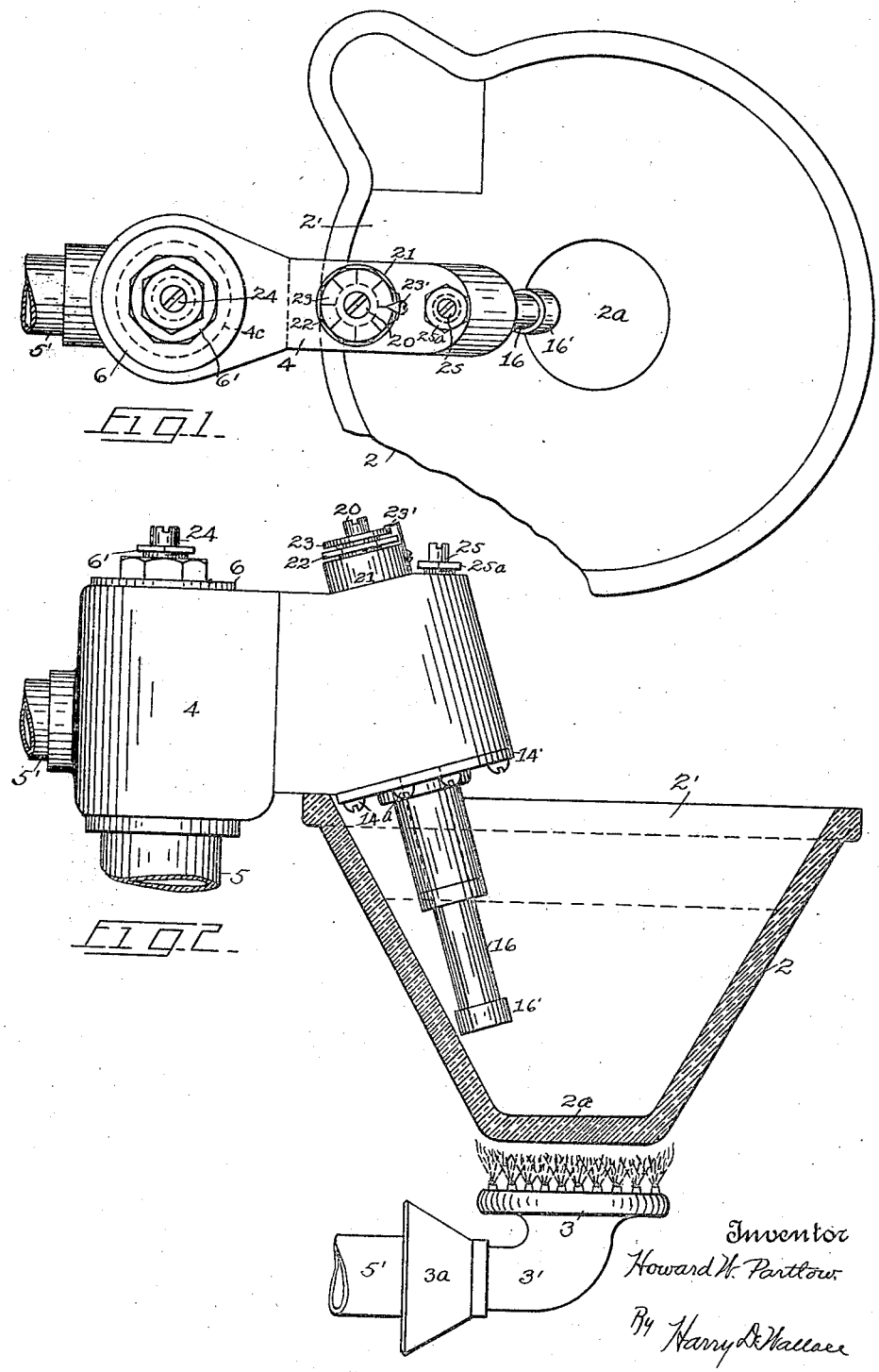

Patented Feb. 26, 1924.

1,484,668

UNITED STATES PATENT OFFICE.

HOWARD WEBSTER PARTLOW, OF UTICA, NEW YORK.

HIGH-PRESSURE GAS GOVERNOR.

Application filed January 19, 1923. Serial No. 613,642.

*To all whom it may concern:*

Be it known that I, HOWARD WEBSTER PARTLOW, a citizen of the United States, residing at Utica, in the county of Oneida and State of New York, have invented certain new and useful Improvements in High-Pressure Gas Governors, of which the following is a specification.

This invention relates to gas governors, designed particularly for use in connection with large melting-pots or caldrons, wherein type and similar metals are re-melted, usually by gas at high pressure.

The object of the invention is to provide a novel and sensitive heat-controlling device, which may be mounted upon a melting-pot, the said device having a thermostatic element which is partially submerged in the molten metal, and which automatically effects the opening and closing of a double-seated balanced valve, which is disposed in a gas-filled casing. A further object is to provide a thermostatic control for melting-pots that are heated by gas at relatively high pressure, and which therefore require a more sensitive and positive gas-control, than where the gas is supplied at the normal pressure which ordinarily obtains in the public mains. A further object is to provide means for accurately predetermining different degrees of temperature for the molten metal within a relatively broad range, and whereby a steady and even heat may be maintained for long or short intervals without any appreciable variations. A further object is to provide a balanced valve structure, wherein the cooling of the metal in the melting-pot below a certain degree, relieves the normal tension of certain of the valve-controlling mechanism, whereby the valve opens instantly by gravity for restoring the temperature, and wherein the valve is moved mechanically towards its seats immediately the temperature of the metal rises above the predetermined degree. A further object is to provide novel means for limiting the closing of the valve for preventing accidental extinguishment of the burner during the heating periods. And a further object is to provide means for varying the volume of the gas relatively to the volume of air to be mixed with the gas, and for limiting the opening range of the valve when the governor is employed in connection with melting-pots of smaller capacity.

The various features and parts of the invention will be understood from the detailed description which follows, and by reference to the accompanying drawings, in which—

Figure 1 is a top-plan view of a melting-pot to which my governor is applied. Fig. 2 is a partial section and a partial side elevation of the same. Fig. 3 is an enlarged top-plan view of the governor. Fig. 4 is a central vertical section, taken on line 4—4 of Fig. 3; showing the balanced valve and the various means for adjusting and operating the same. And Fig. 5 is a reduced view; showing the operation of the valve and related parts.

In the drawings, 2 represents a hopper-like melting-pot, having a broad open top 2', and a relatively narrow bottom $2^a$. 3 represents conventionally a gas-burner, by which the pot may be heated, the burner being disposed directly beneath the bottom $2^a$, and receiving the gas or other fuel through a pipe 3', to which may be attached the usual mixer $3^a$.

The governor comprises a hollow casing 4, having a gas-inlet opening 4' in its bottom, and a gas-outlet opening $4^a$ at one end, the said openings being threaded to receive pipes 5 and 5'. Above the inlet 4', and alining and communicating with the outlet $4^a$, the casing 4 is formed with an inwardly projecting hollow portion $4^b$. In the top of the casing 4 is an opening $4^c$, which is closed by a threaded plug 6, the latter being bored out axially to receive a partially threaded rod 24, which is surrounded by a stuffing-box member 6', and a packing $6^a$, for preventing the escape of the gas around said rod. The part $4^b$ is bored out vertically to receive a hollow cylindrical valve casing 7, the latter being supported in part by an integral annular flange 7', which rests upon the top of said part. The top of the casing 7 is provided with a circular flange $7^a$, which comprises the seat for a spherical valve 8. Below the valve-seat $7^a$, the casing 7 is enlarged and internally threaded for adjustably receiving a smaller concentric cylinder 9, whose top end is provided with an internal flange 9', which comprises the seat for a similar spherical valve 8'. Below the seat 9', the casing 7 is again enlarged to receive a packing $7^b$, the latter being held in place by an annular nut $9^a$, which is preferably screwed on to the lower end of the part 9. The extreme lower-end portion of the body 7 is externally threaded to receive a circular nut 7ᶜ, by which the said body is rigidly held in place. The body 7 is formed with a port 7ᵈ, which discharges the gas into the outlet 4ᵃ. The valves 8—8' are normally positioned below their respective seats, and they are connected for movement as one part, by a rod or stem 8ᵃ. During the heating periods, the casing 4 is filled with the gas under pressure, and owing to the construction and arrangement of the valves 8—8', the latter are perfectly balanced, because an equal pressure is exerted in opposite directions against the two spheres, and as the said spheres are always held and moved in the same relation to their seats 7ᵃ and 9', the said valves are readily operated for controlling the flow of the gas from the casing 4 towards the burner. The twin valves are suspended by means of a rod 10, from one end of a lever 12, the said lever being perforated to receive the said rod, and the upper end of the rod 10 being enlarged and loosely disposed in a socket 12' of the lever 12. The lower end of the rod 10 is similarly enlarged and is disposed and held in a socket 8ᵇ of the uppermost valve, by a bushing 10', which screws into the latter socket. The valves 8—8' are supported entirely by the lever 12. The opposite end of the lever 12 is provided with spaced perforated fulcrum lugs or ears 12ᵃ and 12ᵇ. The lever 12 is supported in part, and is operated vertically by a horse-shoe-shaped lever or part 13, the uppermost arm 13' of which is pivoted to the lug 12ᵃ, by a pin 13ᵃ, while the lowermost arm 13ᵇ is pivoted to the body of a removable support 14, by a pin 13ᶜ. The support 14 includes a flange 14', which embraces the bottom of the main casing 4, and closes a relatively large opening in said bottom, to which the support is secured by screws 14ᵃ. The lug 12ᵇ of the valve lever is also pivotally connected to the body 14, by means of a link 15 and pins 15'. The rocking of the lever 13 on the pivot 13ᶜ, as shown by the full and dotted lines in Fig. 5, effects the raising and lowering of the valves 8—8'. The part 13, and therefore the valves 8—8', are controlled by a thermostatic mechanism, which will now be described:

16 represents a tube, preferably consisting of metal of relatively high expansibility, such for example, as brass, whose upper end is threaded into the hub 14ᵇ of the support 14, while its lower end is fitted with a screw-cap 16'. The lower end of the tube 16 is preferably plugged by a threaded part 17, the latter being formed with an upwardly facing threaded socket 17', into which is screwed the lower end of a second thermostatic member 18, which preferably consists of steel or other suitable metal of low expansibility. The rod 18 extends upwardly through the flange 14' and screws into the lower end of a coupling 19, which is provided with a transverse slot or opening 19', that loosely receives the lowermost arm 13ᵇ of the part 13. The upper end of the coupling 19 has a threaded socket 19ᵃ, in which is screwed the lower end of a rod 18', which alines with and is virtually a continuation of the rod 18. The lower end of the rod 18' preferably extends into the slot 19' of the coupling, and normally bears against a hump 13ᵈ of the arm 13ᵇ. By this construction and arrangement, the expansion or lengthening of the tube 16, pulls downwardly on the rods 18—18' and rocks the lever 13, as from the full line to the dotted line position shown in Fig. 5, for raising or closing the valve 8—8', and thereby reducing the flow of the gas from the casing 4 towards the burner. The contracting or shortening of the tube 16, as by the cooling of the metal in the pot 2, relieves the pressure of the rod 18' on the hump 13ᵈ, and thereby effects the lowering or opening of the valves 8—8' by gravity, as shown by the full lines in Fig. 5. The upper end of the extension rod 18' is slidably disposed in a downwardly facing socket 20' of an adjusting member 20, which is rotatable in a socket 21' formed in a boss 21, the latter preferably being integral to the casing 4. The rod 18' and the member 20 are operatively connected by means of a pin 20ᵃ, which plays in a slot 18ᵃ of the said rod. The socket 21' is sealed against the escape of the gas from the casing 4, by a stuffing-box member 22, which is threaded into the socket 21', and a packing 22'. Above the boss 21 the member 20 is fitted with a disc 23, which is rotatable with said member, and upon the upper face of said disc are arranged graduations and numerals indicating various temperatures, which may be predetermined by the manipulation of the member 20, in a well-known manner. The various temperatures for which the governor may be adjusted and set, may be indicated by means of a pointer 23', which is supported by the boss 21. The rotation of the member 20 correspondingly rotates and moves the rod 18' longitudinally towards and away from the hump 13ᵈ, for lengthening and shortening the strokes of the levers 12 and 13, and thereby varying the movements of the valves 8—8' relatively to their seats 7ᵃ—9'. The rod 24 alines axially with the valves 8—8', and its lower end is provided with a head 24', which normally engages the upper ball-end of the rod 10, as best seen in Fig. 4, for holding the valves 8—8' slightly unseated and thereby preventing the burner 3 from being accidentally extinguished. The provision of the rod 24 obviates the necessity of providing the usual by-pass structure for accomplishing the same work, and affords a more convenient and finer adjustment of the parts, which has been found necessary where the gas is burned under a relatively high-pressure. The rocking of the lever 13 towards the valves 8—8' may be limited, for varying the volume of the gas relatively to the amount of air to be mixed with the gas, by means of a screw 25, which extends downwardly through an opening 25' in the top wall of the casing 4. The opening 25' is sealed, and the screw 25 is supported, in part, by a stuffing-box comprising a bushing 25ª and a packing 25ᵇ. The screw 25 also serves to limit the opening of the valves 8—8', when the device is employed for governing melting-pots of linotype and like machines, where lower temperatures are required, and where the gas, as a rule, is burned at the normal low pressure of the public mains.

The device herein shown and described is extremely simple, and may be adjusted and set for properly governing the gas which is fed to the burner, and by properly adjusting the screw 25, the volume of the gas relatively to the volume of air that enters the mixer 3ª, may be rightly proportioned.

Having thus described my invention, what I claim, is—

1. A gas governor for melting-pots including a casing adapted to be filled with gas, a valve for controlling the flow of the gas from the casing to a burner, a rocking member for operating said valve in one direction, said valve adapted to rock said member in the opposite direction by its gravitation, a thermostatic element in two parts, one of said parts comprising two sections adjustable relatively to each other and to said rocking member for varying the movements of the valve.

2. A gas governor for melting-pots including a casing adapted to be filled with gas, a valve for controlling the flow of the gas from the casing, a lever supporting and operating said valve in one direction, a rocking member for actuating said lever in the one direction, a thermostatic element comprising two parts, one of said parts comprising two sections adjustable relatively to each other for varying the rocking movements of said member, and a dial adapted to operate said adjustable section for predetermining the temperature of the thing heated by the gas.

3. A high-pressure governor for melting-pots, including a hollow casing adapted to be charged with gas and having an outlet, a thermostatic tube depending from said casing adapted to be partially immersed in molten metal carried by the melting-pot, a rod comprising two sections carried by said tube adapted to be moved vertically by the expansion and contraction of said tube, a pair of valve seats arranged axially in a vertical plane adjacent said outlet, a pair of spaced valves connected for operation as one part and movable vertically below said seats, means interposed between said rod and said valves for effecting the raising and lowering of said valves by the lowering and raising of said rod and a temperature indicating member adapted to adjust one section of said rod relative to the other section.

4. A gas governor including a casing adapted to be filled with gas, a valve for controlling the flow of the gas to a burner, a rocking member for moving said valve towards its seat, said valve adapted to rock said member in the opposite direction by its gravitation from its seat, a thermostatic element in two parts one of said parts composed of two sections, a coupling connecting said sections, one of said sections being adjustable relatively to the rocking member for varying the opening and closing movements of the valve, and a dial operatively connected with said adjustable section.

5. A gas governor for melting pots, including a source of combustible gas, a valve for controlling the supply of the gas to a burner, a lever supporting and adapted to move said valve towards its seat, means for limiting the movement of the valve towards its seat, a rocking member for tilting the valve-end of said lever, a thermostatic element in two parts one of said parts comprising two sections connected and operable as one part, means for adjusting one of said sections relatively to the other section for controlling the rocking movements of said member and for predetermining the temperature of the contents of the melting-pot.

6. A gas governor including a casing adapted to be filled with gas, a valve controlling the flow of the gas to a burner, a lever supporting and operating said valve in one direction, a rockable member for tilting said lever in the said direction, a thermostatic element in two parts, one of said parts comprising two alining sections, a coupling connecting said sections, one of said sections directly engaging said rocking member and being adjustable towards and away from said member, and a dial operatively connected to said adjustable section adapted to be set for predetermining the movements of the thermostatic element.

In testimony whereof I affix my signature.

HOWARD WEBSTER PARTLOW.